(12) United States Patent
Nomura

(10) Patent No.: US 8,219,260 B2
(45) Date of Patent: Jul. 10, 2012

(54) TEMPERATURE CONTROL APPARATUS, PROCESSING APPARATUS, AND TEMPERATURE CONTROL METHOD

(75) Inventor: Masatoshi Nomura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1151 days.

(21) Appl. No.: 12/075,987

(22) Filed: Mar. 14, 2008

(65) Prior Publication Data

US 2008/0234875 A1    Sep. 25, 2008

(30) Foreign Application Priority Data

Mar. 22, 2007   (JP) .................. 2007-074402

(51) Int. Cl.
*G05D 23/00*    (2006.01)
(52) U.S. Cl. ...................... 700/299; 700/300
(58) Field of Classification Search .................. 700/299, 700/300
See application file for complete search history.

(56) References Cited

U.S. PATENT DOCUMENTS

| | | | | |
|---|---|---|---|---|
| 4,192,269 | A | * | 3/1980 | Levy ............................. 123/549 |
| 4,656,828 | A | * | 4/1987 | Bingley et al. ............... 60/203.1 |
| 5,032,705 | A | | 7/1991 | Batcheller et al. |
| 6,728,602 | B2 | * | 4/2004 | Husted et al. ................. 700/299 |
| 7,223,490 | B2 | * | 5/2007 | Hayashi et al. ............... 429/429 |
| 2004/0069769 | A1 | | 4/2004 | Carr |
| 2006/0157466 | A1 | | 7/2006 | Miyazaki et al. |

FOREIGN PATENT DOCUMENTS

| | | |
|---|---|---|
| DE | 102 17 336 A1 | 12/2002 |
| EP | 1 684 148 A | 7/2006 |
| EP | 1 684 148 A1 | 7/2006 |
| JP | 2005-108557 A | 4/2005 |
| JP | 2005-314207 A | 11/2005 |

OTHER PUBLICATIONS

Invitation to Pay Additional Fees and a Partial International Search Report dated Oct. 9, 2008, issued in a counterpart International Application.
International Search Report dated Dec. 23, 2008 in connection to Application No. PCT/JP2008/055019.
Written Opinion of the International Searching Authority dated Dec. 23, 2008 in connection to Application No. PCT/JP2008/055019.

\* cited by examiner

*Primary Examiner* — Kakali Chaki
*Assistant Examiner* — Carlos Ortiz Rodriguez
(74) *Attorney, Agent, or Firm* — Holtz, Holtz, Goodman & Chick, PC

(57) ABSTRACT

A temperature control apparatus includes a resistance heater whose a resistance value changes depending on a temperature of the resistance heater; a signal generator to output a control signal having two voltage levels including a first-voltage and a second-voltage; a switching section to flow a first current through the resistance heater when the voltage level of the control signal is the first-voltage, and to flow a second current having a current value smaller than that of the first current through the resistance heater when the voltage level of the control signal is the second-voltage; and a voltage measuring instrument to measure a voltage value across the resistance heater at the time when the second current flows through the resistance heater. The signal generator controls the temperature of the resistance heater based on the voltage value measured by the voltage measuring instrument.

20 Claims, 7 Drawing Sheets

TEMPERATURE CONTROL APPARATUS, PROCESSING APPARATUS, AND TEMPERATURE CONTROL METHOD

BACKGROUND OF THE INVENTION

1. Field of the Invention

The present invention relates to a temperature control apparatus and a temperature control method, and more particularly to a temperature control apparatus, a processing apparatus provided with the temperature control apparatus and a temperature control method for controlling, by a resistance heater having the characteristic such that its resistance value changes dependently on a temperature, the temperature of a member provided with the resistance heater.

2. Description of Related Art

In recent years, a fuel cell has attracted attention as a clean power source having high energy conversion efficiency, and the practical application of the fuel cell to a fuel cell powered vehicle, an electric home, and the like, has been advanced. Moreover, the research and development for using a fuel cell as a power source also in portable electronic equipment, such as a cellular phone and a notebook-size personal computer, has advanced.

A fuel cell is a device for producing electric power by electrochemical reactions between hydrogen and oxygen. The hydrogen to be supplied to the fuel cell is produced from, for example, a liquid fuel, such as methanol. In this case, a reaction apparatus for producing the hydrogen from a liquid fuel and water is connected to the fuel cell.

The reaction apparatus is composed of, for example, a vaporizer vaporizing a liquid fuel and water, a reformer causing the reforming reaction of the vaporized fuel and water to produce hydrogen, and a carbon monoxide remover removing the carbon monoxide infinitesimally produced in the reformer by means of the oxidization thereof. As such a reaction apparatus, a reaction apparatus integrally forming the reformer and the carbon monoxide remover was also developed. For example, a reaction apparatus composed of a joined body of a plurality of substrates exists, the reaction apparatus configured as follows: grooves are formed on the joint surfaces of these substrates; catalysts are carried on the wall surfaces of the grooves; and the substrates are joined with one another so that the grooves may be covered by the substrates to function as the flow paths of the reformer and the carbon monoxide remover.

Now, the temperatures in the reformer and the carbon monoxide remover are set to the temperatures suitable for the respective reactions (optimum temperatures) in order that desired reactions may be efficiently caused in each chamber. Because the optimum temperatures are higher than a room temperature, it is necessary to heat the reformer and the carbon monoxide remover. Moreover, because the reformer and the carbon monoxide remover must be kept at the respective optimum temperatures during being in use, it becomes necessary to control them to keep their temperatures at the optimum temperatures by controlling their temperatures from time to time.

In order to keep the temperatures of the reformer and the carbon monoxide remover at the optimum temperatures, it is general to use a feedback control method. That is, the reformer and the carbon monoxide remover are heated by a resistance heater; the temperatures of the reformer and the carbon monoxide remover are measured with temperature sensors, such as thermocouples; the measured temperatures are fed back; and the supply power to be supplied to the resistance heater is controlled on the basis of the measured temperatures with the temperature sensor. The reformer and the carbon monoxide remover can be thereby kept at the optimum temperatures.

Moreover, if the resistance value of the resistance heater depends on the temperature, then the temperature can be measured on the basis of the resistance value of the resistance heater. The resistance heater can be used also as a temperature sensor accordingly, and the temperature sensor can be omitted.

In this case, there is a method of controlling the temperature of the resistance heater by controlling the current flowing through the resistance heater as the voltage across the resistance heater (response voltage) is being measured with an operational amplifier. In this case, the current value of the current flowing through the resistance heater is set; the current of the current value is flown through the resistance heater; and the voltage of the resistance heater is measured with the operational amplifier to be fed back. The resistance value of the resistance heater is then obtained from the set current value of the current and the measured voltage. Moreover, the temperature of the resistance heater is also obtained from the obtained resistance value of the resistance heater. In order to set the resistance heater at a desired set temperature, the current value of the current flowing through the resistance heater is newly set on the basis of the obtained resistance value or the obtained temperature, and the current of the newly set current value is flown through the resistance heater.

However, because a certain power source voltage is generally applied to a circuit including a resistance heater, it is led to connect a variable resistance in series with the resistance heater to adjust the resistance value of the variable resistance in order to adjust the current flowing through the resistance heater. In this case, useless electric power is consumed at the part of the variable resistance, and power efficiency falls. In addition, heat generation is caused by the consumption of the useless electric power, and the accuracy of temperature control sometimes falls.

Moreover, if the current of the resistance heater is enlarged, then the response voltage of the resistance heater also becomes larger. It becomes necessary to widen the range of the input voltage of operation amplifier for measuring the response voltage of the resistance heater, or to divide the input voltage and to attenuate the divided voltages in respective voltage ranges with an attenuator or the like, accordingly. The resolution of the measurement of the response voltage of the resistance heater falls and the causes of errors of the measurement increase.

SUMMARY OF THE INVENTION

It is an object of the present invention, in a temperature control apparatus and a temperature control method for controlling the temperature of a resistance heater for heating, and processing apparatus provided with the temperature control apparatus, to suppress their power consumption, and to suppress the falling of the resolution of the measurement of the voltage and the like of a resistance heater and the increase of the errors of temperature control.

To achieve above object, a temperature control apparatus of the present invention includes: a resistance heater to have characteristics such that a resistance value of the resistance heater changes dependently on a temperature thereof; a signal generator to output a control signal having two voltage levels of an first-voltage and an second-voltage; a switching section to flow a first current through the resistance heater when the voltage level of the control signal is the first-voltage, and to flow a second current having a current value smaller than that of the first current through the resistance heater when the voltage level of the control signal is the second-voltage; and a voltage measuring instrument to measure a voltage value across the resistance heater at the time when the second current flows through the resistance heater, wherein the signal generator controls the temperature of the resistance heater based on the voltage value measured by the voltage measuring instrument.

To achieve above object, a processing apparatus of the present invention, supplied a raw material, subjected to temperature control thereof, causing a reaction or a phase change of the raw material, the apparatus includes: a processing device to cause the reaction or the phase change of the raw material; and a temperature control apparatus including: a resistance heater, provided in the processing device to heat the processing device, to have characteristics such that a resistance value of the resistance heater changes dependently on a temperature thereof; a signal generator to output a control signal having two voltage levels of an first-voltage and an second-voltage; a switching section to flow a first current through the resistance heater when the voltage level of the control signal is the first-voltage, and to flow a second current having a current value smaller than that of the first current through the resistance heater when the voltage level of the control signal is the second-voltage; and a voltage measuring instrument to measure a voltage value across the resistance heater at the time when the second current flows through the resistance heater, wherein the signal generator controls the temperature of the resistance heater based on the voltage value measured by the voltage measuring instrument.

To achieve above object, a first temperature control method of the present invention for controlling a temperature of a resistance heater having characteristics such that a resistance value of the resistance heater changes dependently on the temperature, the method comprising the steps of: outputting a control signal having two voltage levels of an first-voltage and an second-voltage; flowing a first current through the resistance heater when the voltage level of the control signal is the first-voltage, and flowing a second current having a current value smaller than that of the first current through the resistance heater when the voltage level of the control signal is the second-voltage; measuring a voltage value across the resistance heater at the time when the second current flows through the resistance heater; and controlling the control signal to control the temperature of the resistance heater on a basis of the voltage value measured at the step of measuring the voltage value.

To achieve above object, a second temperature control method of the present invention controlling a temperature of a resistance heater having characteristics such that a resistance value of the resistance heater changes dependently on the temperature, the method includes the steps of: outputting a control signal having two voltage levels of an first-voltage and an second-voltage; flowing a first current through the resistance heater when the voltage level of the control signal is the first-voltage, and flowing a second current having a current value smaller than that of the first current through the resistance heater when the voltage level of the control signal is the second-voltage; measuring a voltage value across the resistance heater at the time when the second current flows through the resistance heater, and measuring the resistance value of the resistance heater on a basis of the measured voltage value and the current value of the second current; and controlling the control signal to control the temperature of the resistance heater on a basis of the resistance value measured at the step of measuring the resistance value.

BRIEF DESCRIPTION OF THE DRAWINGS

The present invention will become more fully understood from the following detailed description and the appended drawings, and thus are not intended as a definition of the limits of the invention, and wherein.

DETAILED DESCRIPTION OF THE PREFERRED EMBODIMENTS

In the following, the preferable embodiments of temperature control apparatus, processing apparatus and temperature control methods according to the present invention will be described with reference to the attached drawings. Incidentally, technically preferable various limitations for embodying the present invention are put on the embodiments described below, but the limitations are not intended to limit the scope of the present invention to the following embodiments and shown examples.

Generating equipment 1 to which a temperature control apparatus according to the present invention is applied is first described.

Figure 1:
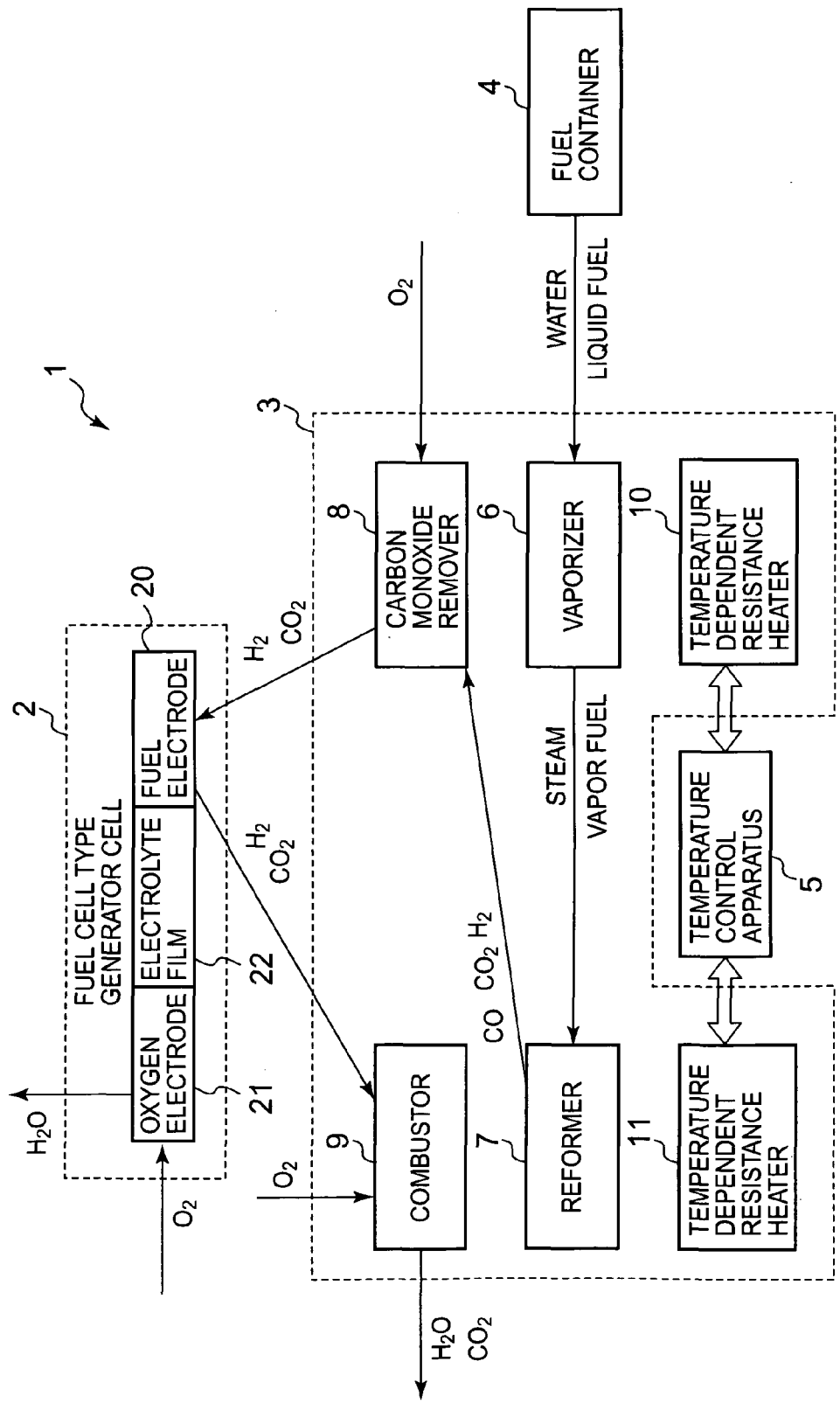
FIG. 1 is a block diagram showing the schematic configuration of generating equipment provided with a temperature control apparatus according to the present invention.

FIG. 1 is a block diagram showing the schematic configuration of the generating equipment 1 provided with the temperature-control apparatus according to the present invention.

The generating equipment 1 is the equipment to be equipped in electronic equipment such as a notebook-size personal computer, a cellular phone, a personal digital assistant (PDA), an electronic organizer, a wrist watch, a digital still camera, a digital video camera, a game instrument, and amusement equipment, and is the equipment to be used as a power source for operating the main body of the electronic equipment.

The generating equipment 1 is composed of a fuel cell type generator cell 2, a processing apparatus 3, and a fuel container 4. The fuel container 4 reserves liquid fuel (for example, methanol, ethanol, dimethyl ether, or gasoline) and water in a separate state or a mixed state therein. The fuel and the water are supplied to the processing apparatus main body 3 by a not-shown pump in a mixed state. Incidentally, the fuel in the fuel container 4 is methanol in the generating equipment shown in FIG. 1.

The processing apparatus main body 3 is composed of a vaporizer 6, a reformer 7, a carbon monoxide remover 8, a combustor 9, and resistance heaters 10 and 11.

Incidentally, the vaporizer 6, the reformer 7, the carbon monoxide remover 8, the combustor 9, and the resistance heaters 10 and 11 are housed in a heat insulating package having an enclosed space, and the dissipation of thermal energy is suppressed by the heat insulating package.

The fuel and the water supplied from the fuel container 4 to the processing apparatus main body 3 are first sent to the vaporizer 6. The fuel and the water sent to the vaporizer 6 are the raw materials, the phases of which are changed in the vaporizer 6. The fuel and the water are vaporized by the vaporizer 6, and the mixture gas of the fuel and the water are sent to the reformer 7. Incidentally, the vaporization by the vaporizer 6 is an endothermic reaction, and the heat of the reactions of the carbon monoxide remover 8 and the heat of the resistance heater 10 are supplied to the vaporizer 6, and the heat is used for the vaporization in the vaporizer 6.

The mixture gas of the fuel and the water, which is sent to the reformer 7, are the raw materials to be reacted in the reformer 7. The reformer 7 produces a hydrogen gas and the like from the vaporized water and the vaporized fuel by a catalyst reaction, and produces a carbon monoxide gas although the quantity thereof is infinitesimal. If the fuel is methanol, then the chemical reactions expressed by the following formulae (1) and (2) are caused in the reformer 7.

The reforming reactions in the reformer 7 are endothermic reactions, and the temperature suitable for the reforming reactions (optimum temperature) is about 280° C. The combustion heat of the combustor 9 and the heat of the resistance heater 11 are supplied to the reformer 7, and the heat is used for the reforming reactions in the reformer 7, accordingly.

$$CH_3OH+H_2O \rightarrow 3H_2+CO_2 \qquad (1)$$

$$H_2+CO_2 \rightarrow H_2O+CO \qquad (2)$$

The hydrogen gas and the like, which have been produced in the reformer 7, are sent to the carbon monoxide remover 8, and the air on the outside is sent to the carbon monoxide remover 8. The carbon monoxide remover 8 selectively removes the by-produced carbon monoxide by preferentially oxidizing it with a catalyst. In the following, the mixture gas from which the carbon monoxide has been removed is referred to as a reformed gas.

Incidentally, the reaction of oxidizing the carbon monoxide is a heat generation reaction, but the carbon monoxide remover 8 is heated by the resistance heater 10 when the temperature of the carbon monoxide remover 8 does not reach the optimum temperature because the temperature suitable for the selective oxidation reaction in the carbon monoxide remover 8 is higher than the room temperature.

The fuel cell type generator cell 2 is configured of a fuel electrode 20, an oxygen electrode 21, and an electrolyte film 22 put between the fuel electrode 20 and the oxygen electrode 21. The reformed gas sent from the carbon monoxide remover 8 is supplied to the fuel electrode 20 of the fuel cell type generator cell 2, and further the air on the outside is sent to the oxygen electrode 21. The hydrogen in the reformed gas supplied to the fuel electrode 20 then electrochemically reacts with the oxygen in the air supplied to the oxygen electrode 21 through the electrolyte film 22, and electric power is generated between the fuel electrode 20 and the oxygen electrode 21. The electric power extracted from the fuel cell type generator cell 2 is supplied to the main body of the electronic equipment, and the electric power is stored in the secondary battery in the main body of the electronic equipment, or a load (liquid crystal display or the like) of the main body of the electronic equipment is operated by the electric power.

If the electrolyte film 22 is the one having the hydrogen ion permeability (for example, a solid polymer electrolyte film), then the reaction expressed by the following formula (3) is caused at the fuel electrode 20, and the hydrogen ions produced at the fuel electrode 20 permeate the electrolyte film 22 to cause the reaction expressed by the following formula (4) at the oxygen electrode 21.

$$H_2 \rightarrow 2H^+ + 2e^- \qquad (3)$$

$$2H^+ + \tfrac{1}{2}O_2 + 2e^- \rightarrow H_2O \qquad (4)$$

On the other hand, if the electrolyte film 22 is the one having oxygen ion permeability (for example, a solid oxide electrolyte film), then the reaction expressed by the following formula (5) is caused at the oxygen electrode 21, and the oxygen ions produced at the oxygen electrode 21 permeate the electrolyte film 22 to cause the reaction expressed by the following formula (6) at the fuel electrode 20.

$$\tfrac{1}{2}O_2 + 2e^- \rightarrow 2O^{2-} \qquad (5)$$

$$H_2 + 2O^{2-} \rightarrow H_2O + 2e^- \qquad (6)$$

The hydrogen gas and the like that have not electrochemically reacted at the fuel electrode 20 to remain as they are sent to the combustor 9. Furthermore, the air on the outside is sent to the combustor 9. The combustor 9 mixes the hydrogen gas (offgas) and oxygen to burn the mixed gas by a catalyst reaction.

Both of the resistance heaters 10 and 11 are made of electric heating materials (electrical resistance materials), such as gold. The resistance heaters 10 and 11 each have a characteristic such that their resistance values change dependently on their temperatures, and a proportionality relation is particularly concluded between the temperatures and the resistance values. Consequently, the resistance heaters 10 and 11 also function as temperature sensors to read their temperatures from their resistance values. The temperatures measured with the resistance heaters 10 and 11 are fed back to a temperature control apparatus 5, and the temperature control apparatus 5 controls the heating values of the resistance heaters 10 and 11 on the basis of the measured temperatures.

The arrangement of each of the vaporizer 6, the reformer 7, the carbon monoxide remover 8, the combustor 9, and the resistance heaters 10 and 11 in the processing apparatus main body 3 is not especially limited. For example, the arrangement in which the carbon monoxide remover 8 and the vaporizer 6 are configured to be laminated on each other and the resistance heater 10 is configured to be mounted on the combined body of the carbon monoxide remover 8 and the vaporizer 6 may be also adopted. In this case, the carbon monoxide remover 8 and the vaporizer 6 are heated by the resistance heater 10.

Moreover, for example, the arrangement in which the reformer 7 and the combustor 9 are laminated on each other and the resistance heater 11 is mounted on the combined body of the reformer 7 and the combustor 9 may be also adopted. In this case, the reformer 7 is heated by the combustor 9 and the resistance heater 11.

Moreover, for example, the arrangement in which the combined body of the reformer 7 and the combustor 9 is coupled with the combined body of the carbon monoxide remover 8 and the vaporizer 6 by the bridge section and heat is conducted from the combined body of the reformer 7 and the combustor 9 to the side of the combined body of the carbon monoxide remover 8 and the vaporizer 6 through the bridge section may be also adopted. In this case, a flow path for flowing hydrogen and the like from the reformer 7 to the carbon monoxide remover 8 is formed in the bridge section.

First Embodiment

A first embodiment of each of the temperature control apparatus and the temperature control method according to the present invention is next described in concrete terms with reference to the drawings.

Figure 2:
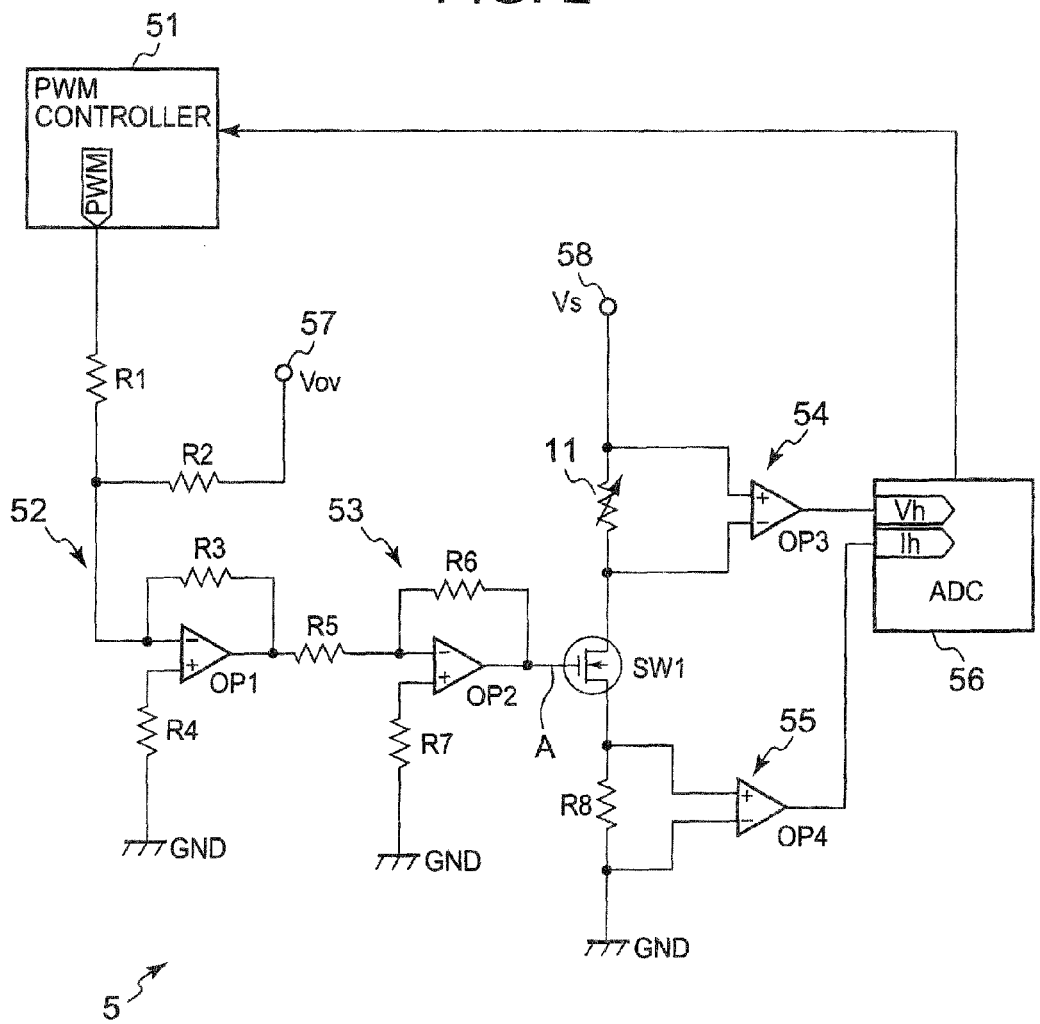
FIG. 2 is a circuit diagram of the circuit of a temperature control apparatus according to a first embodiment of the present invention.

FIG. 2 is a circuit diagram showing the circuit configuration of the temperature control apparatus of the first embodiment of the present invention.

Figure 3:
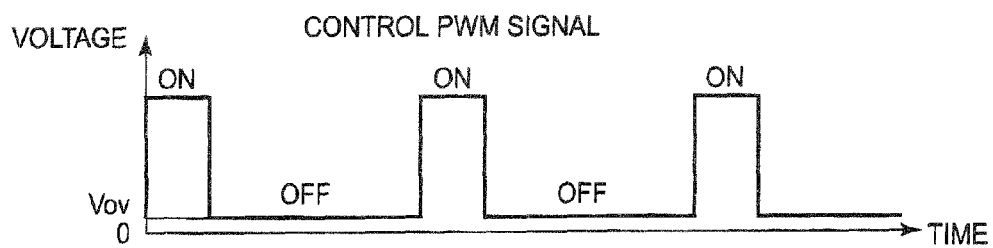
FIG. 3 is a waveform diagram showing an example of the relation between time and voltage levels of a control PWM signal in the first embodiment.

FIG. 3 is a waveform diagram showing an example of the relation between time and voltage levels of a control PWM signal in the first embodiment.

Figure 4:
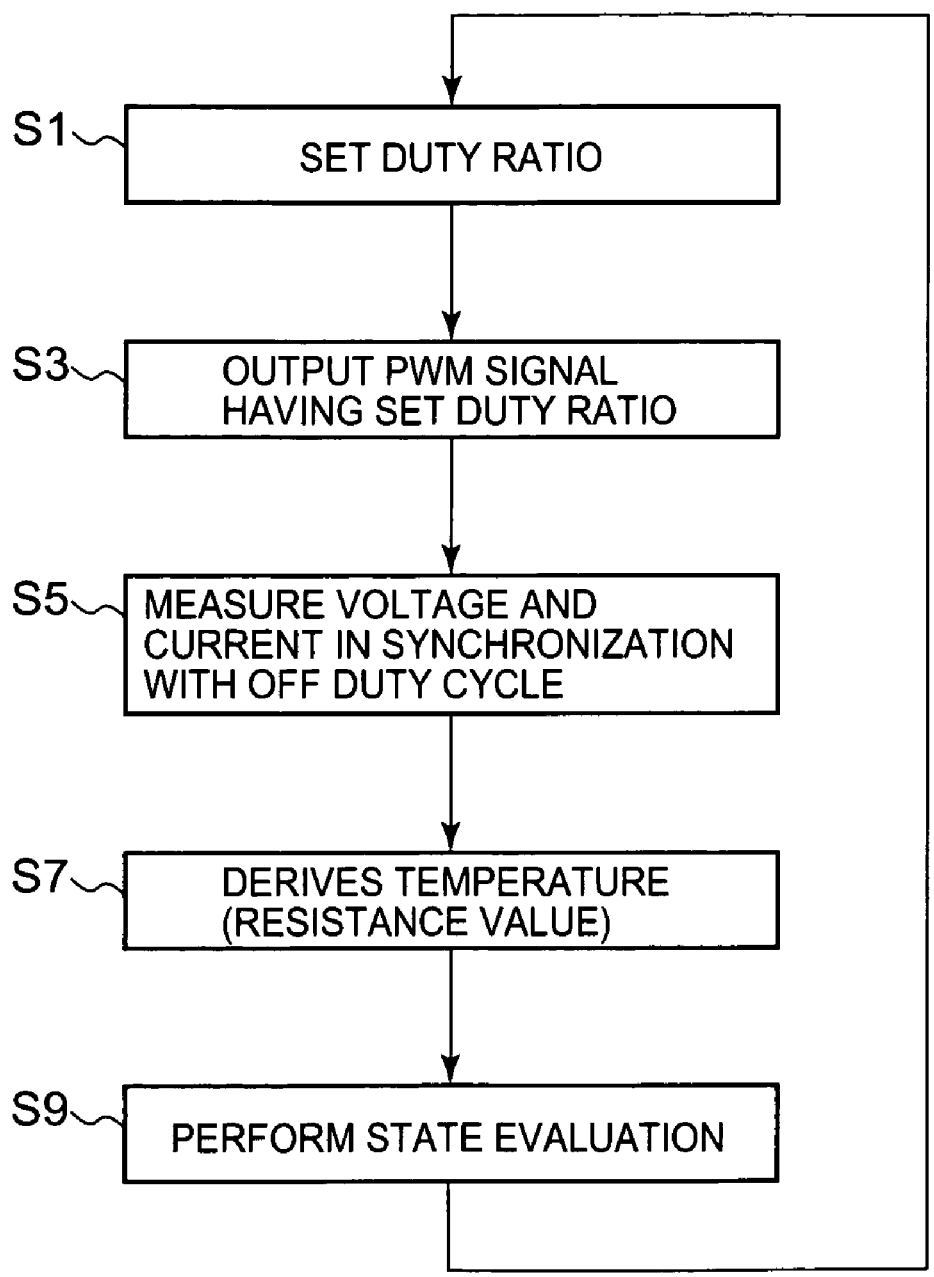
FIG. 4 is a flowchart showing the flow of the processing in the temperature control apparatus of the first embodiment.

FIG. 4 is a flowchart showing the flow of the processing by the temperature control apparatus of the first embodiment.

The temperature control apparatus 5 shown in FIG. 2 is the temperature control apparatus to be applied as the temperature control apparatus 5 shown in FIG. 1. Incidentally, FIG. 2 shows the circuit configuration of the temperature control apparatus 5 corresponding to the resistance heater 11, and the temperature control apparatus has an equal circuit configuration to the resistance heater 10.

The temperature control apparatus 5 is composed of a PWM controller (signal generator) 51, an adder 52 including an operational amplifier OP1 and the like, an inverting amplifier 53 including an operational amplifier OP2 and the like, a differential amplifier 54 including an operational amplifier OP3 and the like, a differential amplifier 55 including an operational amplifier OP4 and the like, an analog to digital converter (hereinafter briefly referred to as ADC) 56, a PWM switch SW1, a sampling resistance R8, and a resistance heater 11.

The PWM controller 51 includes, for example, a central processing unit (CPU), and performs various control operations based on built-in programs and the like. The PWM controller 51 further generates a certain period pulse width modulation signal (hereinafter referred to as a PWM signal), which switches between two voltage levels of an on-voltage (a first-voltage) and an off-voltage (a second-voltage) according to a digital signal supplied from the ADC 56, and outputs the generated PWM signal.

The PWM controller 51 makes the period of the PWM signal constant on the basis of a signal fed back from the ADC 56, and controls the length of the time at the time of the on-voltage of the PWM signal and the length of the time at the time of the off-voltage of the PWM signal. The PWM controller 51 thereby controls the duty ratio of the PWM signal, which is the ratio between the time during the on-voltage and the time during the off-voltage.

The PWM signal output from the PWM controller 51 is a signal the level of which is expressed by a voltage, and the voltage level of the PWM signal changes when the PWM signal takes the on-voltage and when the PWM signal takes the off-voltage. In concrete terms, the polarity of the voltage level of the PWM signal is, for example, the positive polarity when the voltage level of the PWM signal is the on-voltage, and the voltage level of the PWM signal is zero V when the voltage level of the PWM signal is the off-voltage.

The adder 52 is provided with resistances R1-R4 and the operational amplifier OP1, and applies the outputs thereof to the inverting amplifier 53. The resistance R1 and the resistance R3 are connected with each other in series between an input terminal of the adder 52 on one side and the output terminal thereof, and the resistance R2 is connected between the connection part of the resistance R1 and the resistance R3 and an input terminal 57 on the other side. The connection part of the resistance R1 and the resistance R3 is connected to the inverting input terminal of the operational amplifier OP1, and the noninverting input terminal of the operational amplifier OP1 is connected to the ground through the resistance R4. The output terminal of the operational amplifier OP1 is connected to the input terminal (resistance R5) of the inverting amplifier 53. All of the resistance values of the resistances R1-R4 are equal to one another.

A PWM signal output from the PWM controller 51 is input into the input terminal (resistance R1) of the adder 52 on the one side, and a constant superimposing voltage Vov is applied to the input terminal 57 of the adder 52 on the other side.

The adder 52 adds the voltage level of the PWM signal output from the PWM controller 51 and the superimposing voltage Vov together, and inverts the polarity of the sum to output the inverted sum. Consequently, when the voltage level of the PWM signal output from the PWM controller 51 is the on-voltage, the output of the adder 52 is the sum of the level of the on-voltage of the PWM signal and the superimposing voltage Vov having the polarity inverted from that of the original sum. On the other hand, when the PWM signal output from the PWM controller 51 is the off-voltage, the output of the adder 52 is the superimposing voltage Vov (the sum of the level of the PWM signal, which is zero V, and the superimposing voltage Vov) having the polarity inverted from that of the original superimposing voltage Vov. Incidentally, the superimposing voltage Vov has the same polarity as that of the on-voltage of the PWM signal, and is the positive polarity in the present embodiment. The absolute value of the superimposing voltage Vov is smaller than that of the on-voltage of the PWM signal.

Next, the inverting amplifier 53 is provided with resistances R5-R7 and the operational amplifier OP2. An output of the inverting amplifier 53 is output to a node A shown in FIG. 2 as a control PWM signal (control signal) to apply the control PWM signal to the PWM switch SW1. The input terminal of the inverting amplifier 53 is connected to the output terminal of the adder 52, and the resistance R5 and the resistance R6 are connected with each other in series between the input terminal of the inverting amplifier 53 and the output terminal thereof. The connection part between the resistance R5 and the resistance R6 is connected to the inverting input terminal of the operational amplifier OP2, and the noninverting input terminal of the operational amplifier OP2 is connected to the ground through the resistance R7. All of the resistance values of the resistances R5-R7 are equal to one another.

A signal output from the adder 52 is input into the resistance R5 as an input signal through the input terminal of the inverting amplifier 53, and the inverting amplifier 53 inverts the polarity of the input signal to output the inverted input signal. Because the resistance values of the resistance R5 and the resistance R6 are equal to each other here, the amplification degree of the inverting amplifier 53 is 1. Consequently, as shown in FIG. 3, when the voltage level of the PWM signal output from the PWM controller 51 is the on-voltage, the voltage level (the voltage level of the node A) of the output (control PWM signal) of the inverting amplifier 53 is the sum of the on-voltage of the PWM signal output from the PWM controller 51 and the superimposing voltage Vov, or, when the voltage level of the PWM signal output from the PWM controller 51 is the off-voltage, the voltage level (the voltage level of the node A) of the output (control PWM signal) of the inverting amplifier 53 is the superimposing voltage Vov. The voltage level of the control PWM signal at the time when the voltage level of the PWM signal output from the PWM controller 51 is the on-voltage is called as an on-voltage level (a first-voltage level), and the voltage level of the control PWM signal at the time when the voltage level of the PWM signal output from the PWM controller 51 is the off-voltage is called as an off-voltage level (a second-voltage level) here. Incidentally, the resistance values of the resistance R5 and the resistance R6 may not be equal to each other.

The PWM switch SW1 is, for example, an enhancement type n-channel MOS FET, and the output terminal of the inverting amplifier 53 is connected to the gate electrode terminal of the PWM switch SW1. In the first embodiment, the PWM switch SW1 corresponds to a switching section.

The sampling resistance R8 is a fixed resistance. Moreover, the resistance heater 11, the PWM switch SW1, and the sampling resistance R8 are connected to one another in series between a power source input terminal 58 and the ground.

In concrete terms, the resistance heater 11 is connected between the drain electrode terminal of the PWM switch SW1 and the power source input terminal 58, and the sampling resistance R8 is connected between the source electrode terminal of the PWM switch SW1 and the ground.

Incidentally, as long as the resistance heater 11, the PWM switch SW1, and the sampling resistance R8 are connected to one another in series between the power source input terminal 58 and the ground, their alignment sequence is not limited to the one shown in FIG. 2. Moreover, the PWM switch SW1 may not be the MOS FET, but may be a bipolar transistor.

A direct-current constant voltage Vs is applied to the power source input terminal 58. The control PWM signal output from the inverting amplifier 53 is then input into the gate electrode terminal of the PWM switch SW1, and the PWM switch SW1 operates in accordance with the control PWM signal from the inverting amplifier 53. That is, when the control PWM signal input into the gate electrode terminal of the PWM switch SW1 is the on-voltage level, the PWM switch SW1 becomes its on-state, and the part from the power source input terminal 58 to the ground turns to an electrified state. A current then flows from the power source input terminal 58 to the ground through the resistance heater 11, the inter-electrode part between the drain and the source of the PWM switch SW1, and the sampling resistance R8.

On the other hand, when the control PWM signal input into the gate electrode terminal of the PWM switch SW1 is the off-voltage level, the PWM switch SW1 becomes its almost off-state. That is, even if the control PWM signal input into the gate electrode terminal of the PWM switch SW1 is the off-voltage level, the off-voltage level is not zero V, but is the superimposing voltage Vov V. Consequently, the PWM switch SW1 does not become its complete off-state, but a smaller (weaker) current than the one flowing at the time of the on-state flows from the power source input terminal 58 to the ground through the resistance heater 11, the inter-electrode part between the drain and the source of the PWM switch SW1, and the sampling resistance R8.

When the voltage of the gate electrode terminal of the PWM switch SW1 is the on-voltage level and the PWM switch SW1 is in its on-state, that is, when the voltage level of the PWM signal output from the PWM controller 51 is the on-voltage, a current flows from the power source input terminal 58 to the ground through the resistance heater 11, the inter-electrode part between the drain of the PWM switch SW1 and the source thereof, and the sampling resistance R8. The resistance heater 11 thereby performs heat generation. The current flowing through the resistance heater 11 is called as a strong current. The strong current corresponds to a first current.

On the other hand, when the voltage of the gate electrode terminal of the PWM switch SW1 is the off-voltage level and the PWM switch SW1 is almost in the off-state, that is, when the voltage level of the PWM signal output from the PWM controller 51 is the off-voltage, a certain measure of current flows from the power source input terminal 58 to the ground, and the same current also flows through the resistance heater 11. The current value of the current flowing through the resistance heater 11 at this time is smaller than the current value of the aforesaid strong current (first current). The current flowing through the resistance heater 11 at this time is called as a weak current. The weak current corresponds to a second current.

As described above, the duty cycle of the flow of the strong current through the resistance heater 11 is controlled by the control of the duty ratio of the PWM signal by the PWM controller 51, and the heating quantity of the resistance heater 11 is adjusted.

The combination of the differential amplifier 54 and the ADC 56 corresponds to a voltage measuring instrument measuring the voltage of the resistance heater 11. The combination of the sampling resistance R8, the differential amplifier 55, and the ADC 56 corresponds to a current measuring instrument measuring the current of the resistance heater 11. The combination of the differential amplifier 54, the differential amplifier 55, the sampling resistance R8, and the ADC 56 consequently corresponds to a resistance measuring instrument measuring the resistance value of the resistance heater 11.

The differential amplifier 54 outputs a signal indicating the difference between the constant voltage Vs and the voltage at the connection part of the resistance heater 11 and the PWM switch SW1, that is, the voltage across the resistance heater 11, to the ADC 56. The ADC 56 performs the digital conversion of the signal input from the differential amplifier 54, and outputs the converted digital signal indicating the voltage across the resistance heater 11 (hereinafter, referred to as a voltage signal) to the PWM controller 51. Incidentally, because the differential amplifier 54 is a known circuit, the illustration of the components, such as the feedback resistance and the like, of the differential amplifier 54 other than the operational amplifier OP3 are omitted.

The differential amplifier 55 outputs a signal indicating the voltage across the sampling resistance R8 to the ADC 56. The sampling resistance R8 is the fixed resistance here, and the voltage across the sampling resistance R8 depends on the current flowing through the sampling resistance R8 when the resistance value of the sampling resistance R8 is fixed, and the current is same as the one flowing through the resistance heater 11. The signal output from the differential amplifier 55 to the ADC 56 consequently indicates the current flowing through the resistance heater 11.

The ADC 56 next performs the analog to digital conversion of the signal input from the differential amplifier 55, and outputs a digital signal indicating the current of the resistance heater 11 (hereinafter referred to as a current signal) to the PWM controller 51. Incidentally, because the differential amplifier 55 is a known circuit, the illustration of the components, such as the feedback resistance and the like, of the differential amplifier 55 other than the operational amplifier OP4 is omitted.

The PWM controller 51 is synchronized with, for example, the timing of the off-voltage of the PWM signal to read the signals of the voltage value and the current value of the resistance heater 11 output from the ADC 56.

The combination of the current signal and the voltage signal input from the ADC 56 to the PWM controller 51 corresponds to the signal indicating the resistance value of the resistance heater 11. Consequently, the combination of the differential amplifier 54, the differential amplifier 55, the sampling resistance R8, and the ADC 56 corresponds to the resistance measuring instrument measuring the resistance value of the resistance heater 11 to output a signal indicating the measured resistance value to the PWM controller 51.

As described above, the strong current flows through the resistance heater 11 when the voltage level of the PWM signal is the on-voltage, and the weak current flows through the resistance heater 11 when the voltage level of the PWM signal is the off-voltage. The PWM controller 51 obtains the resistance value of the resistance heater 11 (a ratio between the voltage value and the current value) by operating the resistance value from the signals fed back from the ADC 56 when the voltage level of the PWM signal is the off-voltage. The PWM controller 51 then obtains the temperature of the resistance heater 11 from the obtained resistance value on the basis of the temperature dependency of the resistance value of the resistance heater 11. Incidentally, if the resistance value of the resistance heater 11 is denoted by Rh, then the electric power of the resistance heater 11 can be expressed by (Vs×Vs÷Rh). The PWM controller 51 is equipped with, for example, a data table recording the resistance values of the resistance heater 11 to various temperatures, which resistance values have been measured beforehand, and obtains the temperature of the resistance heater 11 by referring to the data table suitably.

The PWM controller 51 changes the value of the duty ratio of the PWM signal to a value suitable for bringing the temperature of the resistance heater 11 close to the temperature (set temperature) to be desired to be set to the resistance heater 11 on the basis of the difference between the obtained temperature of the resistance heater 11 and the set temperature, and re-sets the value. The PWM controller 51 then outputs the PWM signal having the new changed duty ratio to the adder 52.

The operation flow of the temperature control apparatus 5 in the present embodiment is more minutely described on the basis of FIG. 4.

As shown in FIG. 4, the PWM controller 51 first sets the initial duty ratio of the PWM signal to be output (Step S1), and outputs the PWM signal having the set duty ratio (Step S3).

The control PWM signal having the voltage level produced by adding the superimposing voltage Vov to the PWM signal is input into the gate electrode terminal of the PWM switch SW1.

When the voltage level of the PWM signal output from the PWM controller 51 is the on-voltage, the on-voltage level of the control PWM signal output from the inverting amplifier 53 has the voltage level higher than the on-voltage of the PWM signal by the superimposing voltage Vov V. The PWM switch SW1 then becomes its on-state, and the strong current flows through the resistance heater 11.

On the other hand, when the voltage level of the PWM signal output from the PWM controller 51 is the off-voltage, the off-voltage level of the control PWM signal output from the inverting amplifier 53 has the voltage level of the superimposing voltage Vov V. Consequently, the PWM switch SW1 is turned to almost the off-state, and the weak current flows through the resistance heater 11.

The digital signal indicating the current flowing through the resistance heater 11 is then output from the ADC 56 to the PWM controller 51, and the digital signal indicating the voltage of the resistance heater 11 is output from the ADC 56 to the PWM controller 51. The PWM controller 51 reads the voltage value and the current value of the resistance heater 11 in synchronization with the timing of the off-voltage of the PWM signal (Step S5).

The PWM controller 51 obtains the resistance of the resistance heater 11 by operating the voltage value and the current value of the resistance heater 11, and derives the temperature of the resistance heater 11 on the basis of the temperature dependency of the resistance value of the resistance heater 11 (Step S7).

The PWM controller 51 then performs state evaluation, and determines a new duty ratio of the PWM signal necessary for bringing the temperature of resistance heater 11 close to a desired set temperature Tset on the basis of the state evaluation (Step S9).

As the evaluation method here, for example, feedback control by PID control can be applied. That is, if a deviation of a temperature TR_n obtained at the $n^{th}$ control from the start of control and the set temperature (optimum temperature) Tset is denoted by en=TR_n−Tset, then a new duty ratio A for bringing the temperature of the resistance heater 11 close to the set temperature (optimum temperature) Tset can be set by a general relational expression A=P{en+IΣen+D(en−en$^{-1}$)} by using a proportional weighting coefficient P, an integration weighting coefficient I, and a differentiation weighting coefficient D, which are determined in advance.

The processing at Steps S1-S9 mentioned above is similarly executed on the basis of the new duty ratio determined in the way mentioned above, and the series of the control operations are repeatedly executed.

The temperature of the resistance heater 11 is thereby set to the set temperature, and the temperature control is performed so as to keep the temperature at the set temperature.

Incidentally, the series of the processing from Step S1 to Step S9 shown in FIG. 4 is performed every period of the PWM signal or every predetermined number of periods thereof.

As described above, according to the present embodiment, because a PWM control method is used in the temperature control by which the temperature of the resistance heater 11 is set at a set temperature (optimum temperature) and the set temperature is kept, the electric power consumption at the parts other than the resistance heater 11 can be suppressed, and the heat generation at the parts other than the resistance heater 11 can be suppressed. That is, because the PWM control method is used, the resistance value of the sampling resistance R8 can be made to be sufficiently small. When the voltage level of the PWM signal is the on-voltage, the electric power consumption by the sampling resistance R8 and the PWM switch SW1 can be suppressed, and almost all of the electric power is consumed by the resistance heater 11. On the other hand, when the voltage level of the PWM signal is the off-voltage, a current flows from the power source input terminal 58 to the ground, but the current is very small. Consequently, the electric power consumption can be suppressed.

When the voltage level of the PWM signal is the off-voltage, very small current flows through the resistance heater 11. As a result, the response voltages of the resistance heater 11 and the sampling resistance R8 are also small. Accordingly, because the small response voltage of the resistance heater 11 is measured with the operational amplifier OP3 of the differential amplifier 54 and the small response voltage of the sampling resistance R8 is measured with the operational amplifier OP4 of the differential amplifier 55, the gains of the operational amplifiers OP3 and OP4 can be set to be high, and measurement resolution can be raised.

Incidentally, if the PWM switch SW1 is a depression type MOS FET, a minute current flows from the power source input terminal 58 to the ground though the resistance heater 11, the PWM switch SW1, and the sampling resistance R8 even if the voltage applied to the gate electrode terminal is zero V. The configuration of inputting the PWM signal output from the PWM controller 51 into the gate electrode terminal of the PWM switch SW1 directly without being provided with the adder 52 and the inverting amplifier 53 may be adopted.

Moreover, if the off-voltage level is not zero V and has the equal voltage level to the superimposing voltage Vov when the voltage level of the PWM signal output from the PWM controller 51 is the off-voltage, the configuration of inputting the PWM signal output from the PWM controller 51 into the gate electrode terminal of the PWM switch SW1 directly may be adopted even if the PWM switch SW1 is the enhancement type MOS FET. Also in this case, when the voltage level of the PWM signal is the off-voltage, the PWM switch SW1 does not become its complete off-state, and a weak current is led to flow from the power source input terminal 58 to the ground through the resistance heater 11, the PWM switch SW1, and the sampling resistance R8.

Second Embodiment

A second embodiment of each of the temperature control apparatus and the temperature control method according to the present invention is next described.

Figure 5:
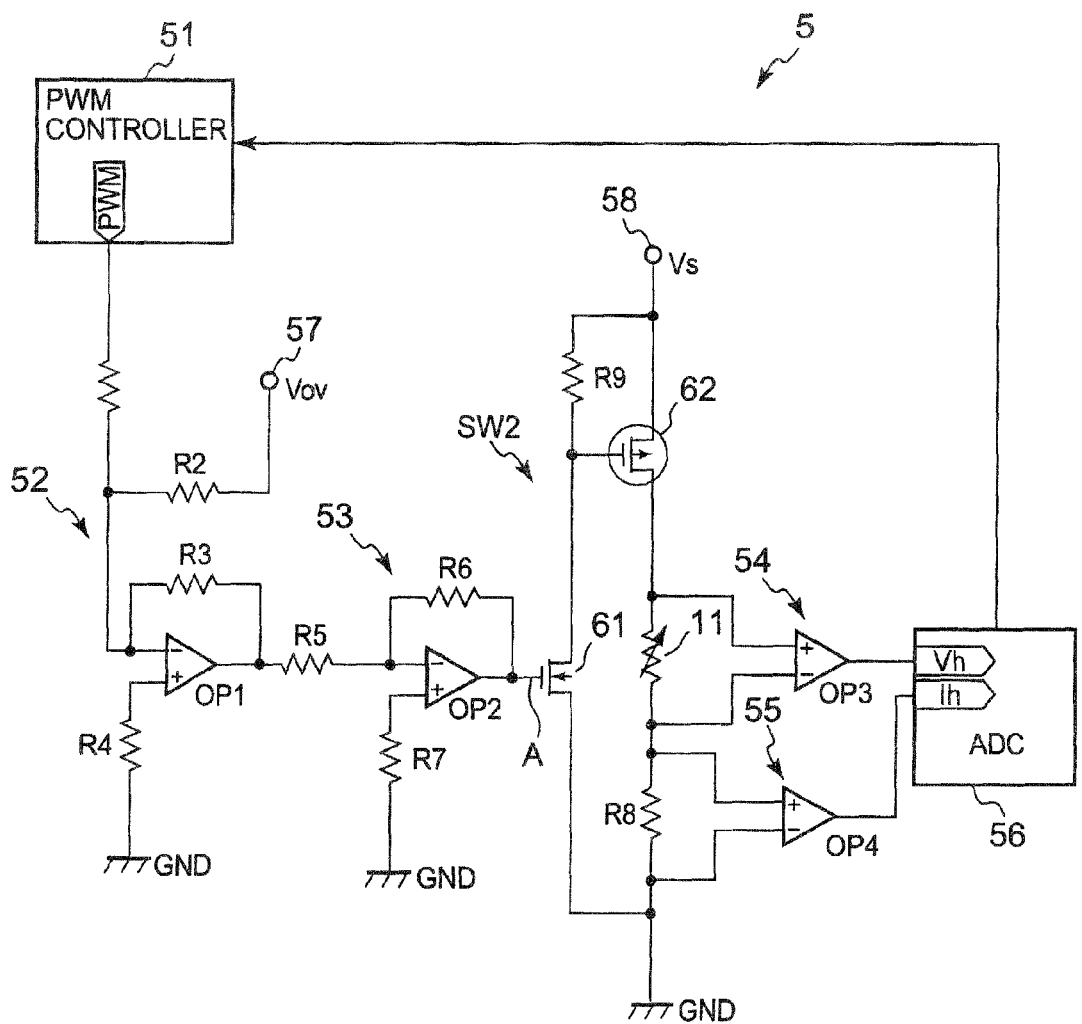
FIG. 5 a circuit diagram showing the circuit configuration of a temperature control apparatus according to a second embodiment of the present invention.

FIG. 5 is a circuit diagram showing the circuit configuration of the temperature control apparatus according to the second embodiment of the present invention.

The temperature control apparatus 5 shown in FIG. 5 is applied as the temperature control apparatus 5 shown in FIG. 1 in place of the temperature control apparatus 5 shown in FIG. 2.

Incidentally, the same configurations as those of the first embodiment are denoted by the same symbols as those of the first embodiment, and their descriptions are simplified or omitted.

In the present embodiment, as shown in FIG. 5, a PWM switch SW2 corresponding to the switching section is provided with an enhancement type n-channel MOS FET 61, an enhancement type p-channel MOS FET 62, and a resister R9. The MOS FET 62, the resistance heater 11, and the sampling resistance R8 are connected to one another in series between the power source input terminal 58 and the ground.

In concrete terms, the sampling resistance R8 is connected between the resistance heater 11 and the ground, and the resistance heater 11 is connected between the drain electrode terminal of the MOS FET 62 and the sampling resistance R8. The source electrode terminal of the MOS FET 62 is connected to the power source input terminal 58.

Moreover, the source electrode terminal of the MOS FET 61 is connected to the ground, and the drain electrode terminal of the MOS FET 61 is connected to the gate electrode terminal of the MOS FET 62. The resister R9 is connected between the connection part of the MOS FETs 61 and 62 and the power source input terminal 58.

The temperature control apparatus 5 of the second embodiment has substantially the same configuration as that of the temperature control apparatus 5 of the first embodiment except for the change of the PWM switch SW1 into the PWM switch SW2 as compared with the temperature control apparatus 5 of the first embodiment.

Also in the temperature control apparatus 5 of the present embodiment, the PWM controller 51 changes the value of the duty ratio of the PWM signal so as to bring the temperature of the resistance heater 11 close to the set temperature on the basis of the signal fed back from the ADC 56 similarly in the case of the temperature control apparatus 5 of the first embodiment, and re-sets the value. The PWM controller 51 outputs the PWM signal having the changed duty ratio.

In the temperature control apparatus 5 of the present embodiment, the control PWM signal having the voltage level including the added superimposing voltage Vov is input into the gate electrode terminal of the MOS FET 61.

During the period in which the voltage level of the PWM signal is the on-voltage, both of the MOS FET 61 and the MOS FET 62 then become their on-state, and the strong current flows through the resistance heater 11.

On the other hand, during the period in which the voltage level of the PWM signal is the off-voltage, both of the MOS FET 61 and the MOS FET 62 become almost their off-states, and the weak current flows through the resistance heater 11.

The signal indicating the voltage across the resistance heater 11 is then output from the differential amplifier 54 to the ADC 56, and the signal indicating the current flowing through the resistance heater 11 is output from the differential amplifier 55 to the ADC 56. A digital signal indicating the voltage across the resistance heater 11 and a digital signal indicating the current flowing through the resistance heater 11 are output from the ADC 56 to the PWM controller 51.

The PWM controller 51 reads the signals of the voltage value and the current value of the resistance heater 11 input from the ADC 56 as a feedback in synchronization with, for example, the timing of the off-voltage of the PWM signal.

The PWM controller 51 then operates the voltage value and the current value of the resistance heater 11 to obtain the resistance value of the resistance heater 11. The PWM controller 51 then obtains the temperature of the resistance heater 11 from the obtained resistance value thereof on the basis of the temperature dependency of the resistance value of the resistance heater 11.

The PWM controller 51 changes the value of the duty ratio of the PWM signal into a value suitable for bringing the temperature of the resistance heater 11 close to the temperature desired to be set to the resistance heater 11 (set temperature) on the basis of the difference between the obtained temperature of the resistance heater 11 and the set temperature, and re-sets the value. The PWM controller 51 outputs the PWM signal having the changed new duty ratio. The PWM controller 51 repeatedly performs the control operation described above.

Third Embodiment

A third embodiment of each of the temperature control apparatus and the temperature control method according to the present invention is next described.

Figure 6:
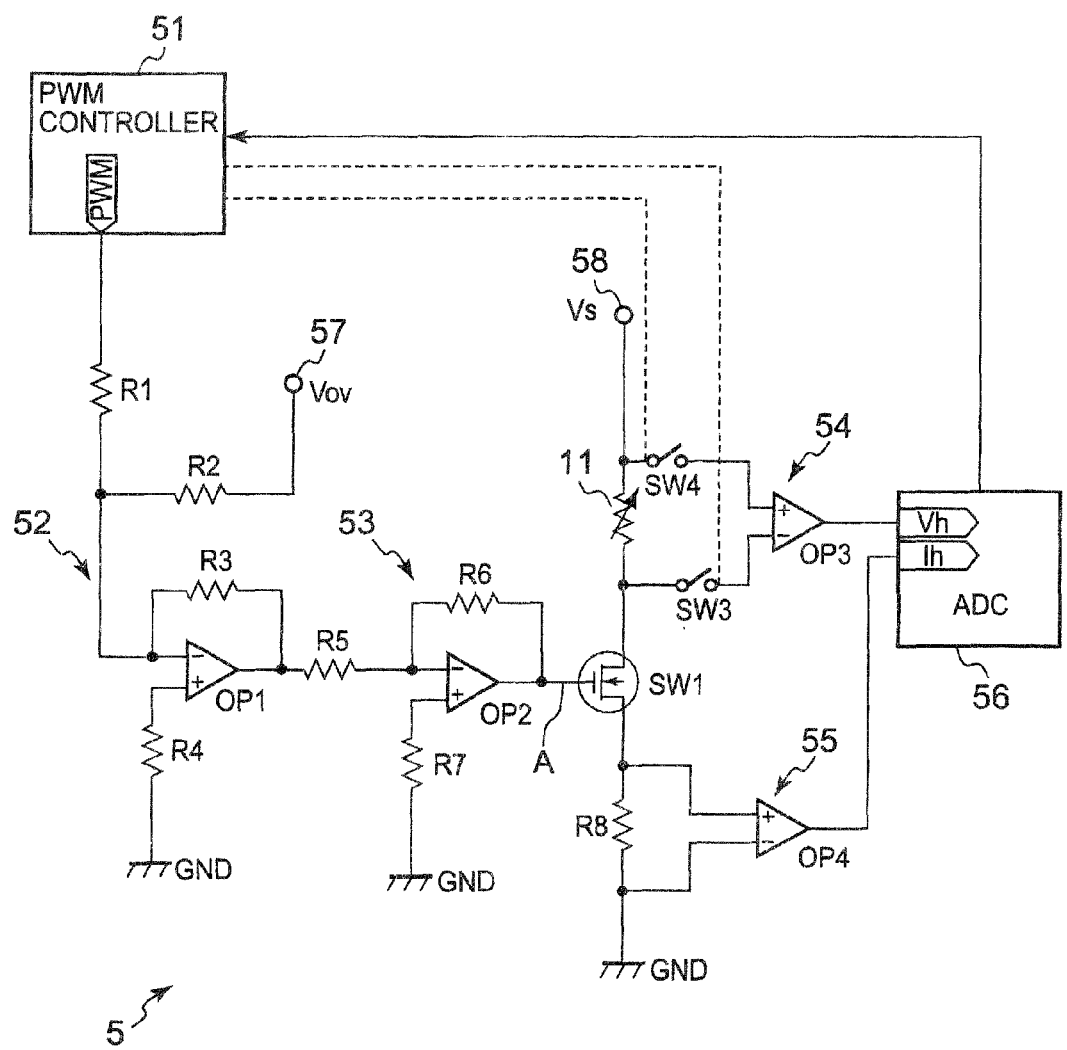
FIG. 6 is a circuit diagram of the circuit configuration of a temperature control apparatus according to a third embodiment of the present invention.

FIG. 6 is a circuit diagram showing the circuit configuration of the temperature control apparatus of the third embodiment of the present invention.

The temperature control apparatus 5 shown in FIG. 6 is the one to be applied as the temperature control apparatus 5 shown in FIG. 1 in place of the temperature control apparatus 5 shown in FIG. 2.

Incidentally, the same configurations as those of each of the embodiments are denoted by the same symbols as those of the embodiments, and their descriptions are simplified or omitted.

The temperature control apparatus 5 shown in FIG. 6 further includes switching elements SW3 and SW4 in addition to the components of the temperature control apparatus 5 shown in FIG. 2. The switching elements SW3 and SW4 are provided between the resistance heater 11 and the inputs of the differential amplifier 54 (the inverting input terminal of the operational amplifier OP3 and the noninverting input terminal thereof), respectively. Incidentally, as the switching elements SW3 and SW4, an FET and a bipolar transistor can be used.

Also in the temperature control apparatus 5 of the third embodiment, the PWM controller 51 sets a duty ratio, and outputs a PWM signal of the set duty ratio. The PWM signal of the voltage including the added superimposing voltage Vov is input into the gate electrode terminal of the PWM switch SW1. When the PWM signal is the on-voltage, the voltage level of the control PWM signal input into the gate electrode terminal of the PWM switch SW1 then becomes on-voltage level, and the strong current flows through the resistance heater 11. When the voltage level of the PWM signal is the off-voltage, the voltage level of the control PWM signal input into the gate electrode terminal of the PWM switch SW1 becomes the off-voltage level, and the weak current flows through the resistance heater 11.

Furthermore, the PWM controller 51 outputs signals (which may be inverted ones) in synchronization with the PWM signal to be output to the adder 52 to the switching elements SW3 and SW4. The switching elements SW3 and SW4 are controlled so as to become their on-states in synchronization with the off-voltage of the PWM signal, and so as to become their off-states in synchronization with the on-voltage of the PWM signal.

When the voltage level of the PWM signal is the off-voltage, the signal indicating the current value of the weak current flowing through the resistance heater 11 is thereby output from the differential amplifier 55 to the ADC 56, and the signal indicating the voltage value across the resistance heater 11 is output from the differential amplifier 54 to the ADC 56. The digital signal indicating the voltage across the resistance heater 11 and the digital signal indicating the current value of the weak current flowing through the resistance heater 11 are output from the ADC 56 to the PWM controller 51.

The PWM controller 51 reads the signals of the voltage value across the resistance heater 11 and the current value of the weak current, which signals are input from the ADC 56 as a feedback in synchronization with, for example, the off-voltage of the PWM signal.

The PWM controller 51 then obtains the resistance value of the resistance heater 11 by operating the voltage value of the resistance heater 11 and the current value of the weak current. The PWM controller 51 then obtains the temperature of the resistance heater 11 from the resistance value thereof on the basis of the temperature dependency of the resistance value of the resistance heater 11.

The PWM controller 51 changes the value of the duty ratio of the PWM signal into the value suitable for bringing the temperature of the resistance heater 11 close to the temperature (set temperature) desired to be set to the resistance heater 11 on the basis of difference between the obtained temperature of the resistance heater 11 and the set temperature, and re-sets the value. The PWM controller 51 outputs the PWM signal of the changed new duty ratio. The PWM controller 11 repeatedly performs the control operations described above.

The PWM controller 51 sets a new duty ratio so as to bring the temperature of the resistance heater 11 close to the set temperature in accordance with the temperature (resister) of the resistance heater 11. After that, the PWM controller 51 repeats the processing.

In the third embodiment, large current flows through the resistance heater 11 when the voltage level of the PWM signal is the on-voltage, and the relatively high voltage across the resistance heater 11 is not applied to the operation amplifier OP3 of the differential amplifier 54. Consequently, the maximum value of the voltage applied to the input terminal of the operational amplifier OP3 can be suppressed to the relatively small voltage across the resistance heater 11 when the weak current flows through the resistance heater 11, and then an operation amplifier having a relatively low withstand voltage can be used as the operational amplifier OP3, which can reduce the costs thereof.

Fourth Embodiment

A fourth embodiment of each of the temperature control apparatus and the temperature control method according to the present invention is next described.

Figure 7:
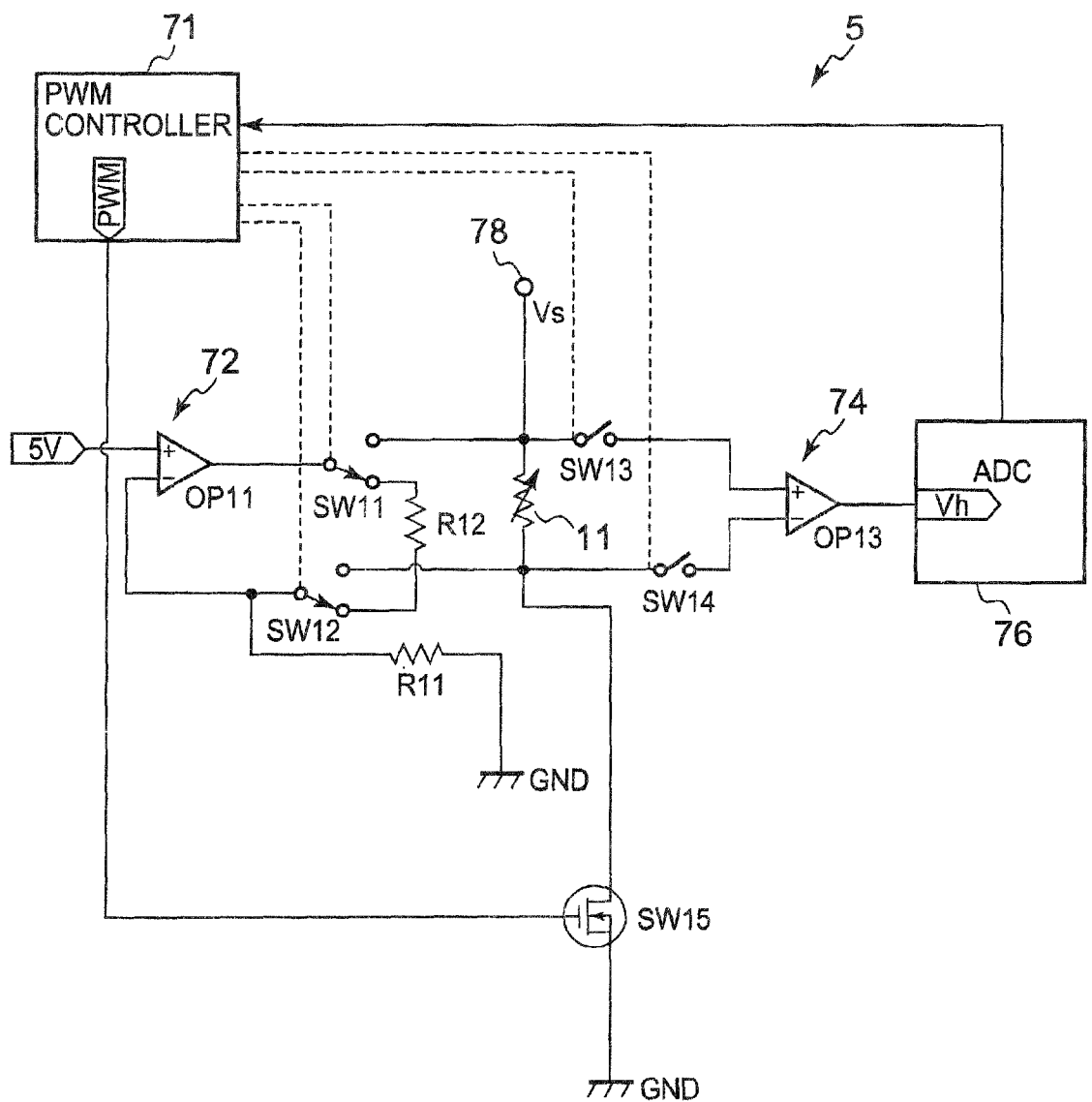
FIG. 7 is a circuit diagram showing the circuit configuration of a temperature control apparatus according to a fourth embodiment of the present invention.

FIG. 7 is a circuit diagram showing the circuit configuration of the temperature control apparatus of the fourth embodiment of the present invention.

The temperature control apparatus 5 shown in FIG. 7 is the one applied as the temperature control apparatus 5 shown in FIG. 1 in place of the temperature control apparatus 5 shown in FIG. 2.

Incidentally, the same configurations as those of each of the embodiments described above are denoted by the same symbols as those of the embodiments, and their descriptions are simplified or omitted.

The temperature control apparatus 5 shown in FIG. 7 is composed of a PWM controller 71, a constant current circuit 72, switching elements SW11-SW14, a dummy resistance R12, a PWM switch SW15, a differential amplifier 74 including an operational amplifier OP13 and the like, an analog to digital converter (hereinafter, referred to as an ADC) 76, a PWM switch SW15, and the resistance heater 11.

In the fourth embodiment, a combination of the switching elements SW11 and SW12 and the PWM switch SW15 corresponds to the switching section here.

The PWM controller 71 includes, for example, a central processing unit (CPU), and outputs the PWM signal of a certain period in which two voltage levels of the on-voltage and the off-voltage are switched according to a digital signal supplied from the ADC 76.

The PWM controller 71 makes the period of the PWM signal constant on the basis of a signal fed back from the ADC 76, and controls the length of the time at the time of the on-voltage of the PWM signal and the length of the time at the time of the off-voltage of the PWM signal. The PWM controller 71 thereby controls the duty ratio of the PWM signal, which is the ratio of the time during the on-voltage and the time during the off-voltage.

The PWM signal output from the PWM controller 71 is a signal the level of which is expressed by a voltage, and the voltage level of the PWM signal changes when the PWM signal takes the on-voltage and when the PWM signal takes the off-voltage. In concrete terms, the polarity of the voltage level of a PWM signal is, for example, the positive polarity when the voltage level of the PWM signal is the on-voltage, and the voltage level of the PWM signal is zero V when the voltage level of the PWM signal is the off-voltage.

The PWM switch SW15 is an enhancement type n-channel MOS FET.

Moreover, the resistance heater 11 and the PWM switch SW15 are connected to each other in series between a power source input terminal 78 and the ground. In concrete terms, the resistance heater 11 is connected between the drain electrode terminal of the PWM switch SW15 and the power source input terminal 78, and the source electrode terminal of the PWM switch SW15 is connected to the ground. Incidentally, the PWM switch SW15 may not be the MOS FET, but may be a bipolar transistor.

A direct-current constant voltage Vs is applied to the power source input terminal 78. The PWM signal output from the PWM controller 71 is input into the gate electrode terminal of the PWM switch SW15, and the PWM switch SW15 operates in accordance with the PWM signal.

That is, when the PWM signal input into the gate electrode terminal of the PWM switch SW15 is the on-voltage, the PWM switch SW1 becomes its on-state, and the part from the power source input terminal 78 to the ground turns to an electrified state. A current then flows from the power source input terminal 78 to the ground through the resistance heater 11 and the PWM switch SW15. The current flowing through the resistance heater 11 at this time corresponds to the strong current (first current) in each of the embodiments described above.

On the other hand, when the PWM signal input into the gate electrode terminal of the PWM switch SW15 is the off-voltage, the PWM switch SW15 becomes its off-state, and no currents flow through the resistance heater 11 and the PWM switch SW15.

As described above, the duty cycle of the flow of the current through the resistance heater 11 is controlled by the control of the duty ratio of the PWM signal by the PWM controller 71, and the heating quantity of the resistance heater 11 is adjusted.

The constant current circuit 72 includes an operational amplifier OP11 and a resister R11. A constant voltage is applied to the noninverting input terminal of the operational amplifier OP11, and the resister R11 is connected between the inverting input terminal of the operational amplifier OP11 and the ground. The switching element SW11 is connected to the output terminal of the operational amplifier OP11, and the switching element SW12 is connected to the inverting input terminal of the operational amplifier OP11. A dummy resistance R12 is connected between the switching element SW11 and the switching element SW12. Furthermore, the resistance heater 11 is connected between the switching element SW11 and the switching element SW12.

The switching elements SW11 and SW12 each perform switching in synchronization with the PWM signal by the PWM controller 71. When the voltage level of the PWM signal is the on-voltage, the switching elements SW11 and SW12 switch to the side of the dummy resistance R12, and the dummy resistance R12 is connected between the output terminal of the operational amplifier OP11 and the inverting input terminal thereof. A current then flows through the dummy resistance R12.

On the other hand, when the voltage level of the PWM signal is the off-voltage, the switching elements SW1 and SW2 switch to the side of the resistance heater 11, and the resistance heater 11 is connected between the output terminal of the operational amplifier OP11 and the inverting input terminal thereof. Then, the circuit state becomes the one in which the electrification of the resistance heater 11 is performed.

When the switching elements SW11 and SW12 switch and the resistance heater 11 becomes the state of being electrified, a certain constant current flows from the power source input terminal 78 to the ground through the resistance heater 11, the switching element SW12, and the resister R11. The constant current flowing through the resistance heater 11 corresponds to the weak current (second current) in each of the embodiments at this time, and the current value is set to be a smaller value than the current value of the current (strong current) flowing through the resistance heater 11 at the time when the voltage level of the PWM signal is the on-voltage.

The differential amplifier 74 includes an operational amplifier OP13 and the like. The differential amplifier 74 is a known circuit, and the illustration of the feedback resistance and the like of the differential amplifier 74 except for the operational amplifier OP13 is omitted. The switching elements SW13 and SW14 are provided between the resistance heater 11 and the inputs of the differential amplifier 74 (the noninverting input terminal of the operational amplifier OP13 and the inverting input terminal thereof), respectively. Incidentally, as the switching elements SW13 and SW14, an FET and a bipolar transistor can be used.

The PWM controller 71 outputs signals in synchronization with the PWM signal (which may be inverted ones) to the switching elements SW13 and SW14. The switching elements SW13 and SW14 are controlled so as to become their on-states in synchronization with the timing of the off-voltage of the PWM signal, and so as to become their off-states in synchronization with the on-duty of the PWM signal.

When the switching elements SW13 and SW14 are their on-states, the differential amplifier 74 outputs a signal indicating the difference between the constant voltage Vs and the voltage at the connection part of the resistance heater 11 and the PWM switch SW15, that is, the voltage across the resistance heater 11, to the ADC 76. The ADC 76 performs the analog to digital conversion of the signal input from the differential amplifier 74, and outputs the digital signal indicating the voltage across the resistance heater 11 (hereinafter, referred to the voltage signal) to the PWM controller 71. The combination of the differential amplifier 74 and the ADC 76 consequently corresponds to the voltage measuring instrument measuring the voltage of the resistance heater 11.

Because the switching elements SW13 and SW14 become their on-states when the PWM signal is the off-voltage here, the voltage signal indicating the voltage across the resistance heater 11 is output from the ADC 76 to the PWM controller 71 when the constant current by the constant current circuit 72 is flowing through the resistance heater 11.

The PWM controller 71 reads the voltage value across the resistance heater 11 from the signal input from the ADC 76 as a feedback, for example, when the voltage level of the PWM signal is the off-voltage.

The PWM controller 71 then operates the voltage value and the value of the constant current by the constant current circuit 72 to obtain the resistance value of the resistance heater 11. The PWM controller 71 obtains the temperature of the resistance heater 11 from the resistance value on the basis of the temperature dependency of the resistance value of the resistance heater 11.

The PWM controller 71 changes the value of the duty ratio of the PWM signal into a value suitable for bringing the temperature of the resistance heater 11 close to the temperature (set temperature) desired to be set to the resistance heater on the basis of the difference between the obtained temperature of the resistance heater 11 and the set temperature, and re-sets the value. The PWM controller 71 outputs the PWM signal of the changed new duty ratio to the gate electrode terminal of the PWM switch SW15. The PWM controller 71 performs the above control operations repeatedly.

The order of the operation of the temperature control apparatus 5 in the present embodiment is described.

The PWM controller 71 first sets the initial duty ratio of the PWM signal to be output, and outputs the PWM signal having the set duty ratio. The output PWM signal is then applied to the gate electrode terminal of the PWM switch SW15.

When the voltage level of the PWM signal is the on-voltage, the voltage level input into the gate electrode terminal of the PWM switch SW15 becomes the on-voltage, and a current (strong current) flows through the resistance heater 11.

When the voltage level of the PWM signal is the off-voltage, the voltage level input into the gate electrode terminal of the PWM switch SW15 becomes the off-voltage, and the constant current (weak current) flows through the resistance heater 11.

The digital signal indicating the voltage across the resistance heater 11 is output from the ADC 76 to the PWM controller 71 during the time when the constant current is flowing through the resistance heater 11.

The PWM controller 71 reads the voltage value across the resistance heater 11 in synchronization with the off-voltage of the PWM signal.

The PWM controller 71 obtains the resistance value of the resistance heater 11 by operating the voltage value across the resistance heater 11 and the current value of the constant current, and obtains the temperature of the resistance heater 11 from the resistance value of the resistance heater 11 on the basis of the temperature dependency of the resistance value of the resistance heater 11.

The PWM controller 71 then performs state evaluation similar to that in the case of the first embodiment described above, and determines a new duty ratio for bringing the temperature of the resistance heater 11 close to the set temperature on the basis of the obtained value of the temperature of the resistance heater 11.

The operation mentioned above is similarly executed on the basis of the new duty ratio determined in the way mentioned above, and the series of the control operations are repeatedly executed.

The temperature of the resistance heater 11 is thereby set to the set temperature, and the temperature control is performed so as to keep the temperature at the set temperature.

Also in the present embodiment, because the PWM control method is used, the electric power consumption at the parts other than the resistance heater 11 can be suppressed, and the heat generation at the parts other than the resistance heater 11 can be suppressed.

Moreover, when the voltage level of the PWM signal is the off-voltage, a very small current flows through the resistance heater 11. As a result, the response voltage of the resistance heater 11 is also small. Consequently, the gain of the operational amplifier OP13 of the differential amplifier 74 can be set to be high, and measurement resolution can be raised.

Moreover, when a large current flows through the resistance heater 11 when the voltage level of the PWM signal is the on-voltage, but the relatively high voltage across the resistance heater 11 at that time is intercepted by the switching elements SW13 and SW14 and is not applied to the operational amplifier OP13 of the differential amplifier 74. Consequently, the maximum value of the voltage applied to the input terminal of the operational amplifier OP3 can be suppressed to the relatively small voltage across the resistance heater 11 when the weak current flows through the resistance heater 11, and an operational amplifier having the relatively low withstand voltage can be used as the operational amplifier OP3. Thus the cost thereof can be reduced. Moreover, because the current flowing through the resistance heater 11 when the voltage level of the PWM signal is the off-voltage can be made to be a small stable constant current, the voltage of the resistance heater 11 can be measured at high accuracy.

The advantages of the embodiments of the present invention are next described as compared with those of the conventional configuration.

The configuration of a conventional temperature control apparatus and the temperature control operation thereof as comparative examples are first described.

Figure 8:
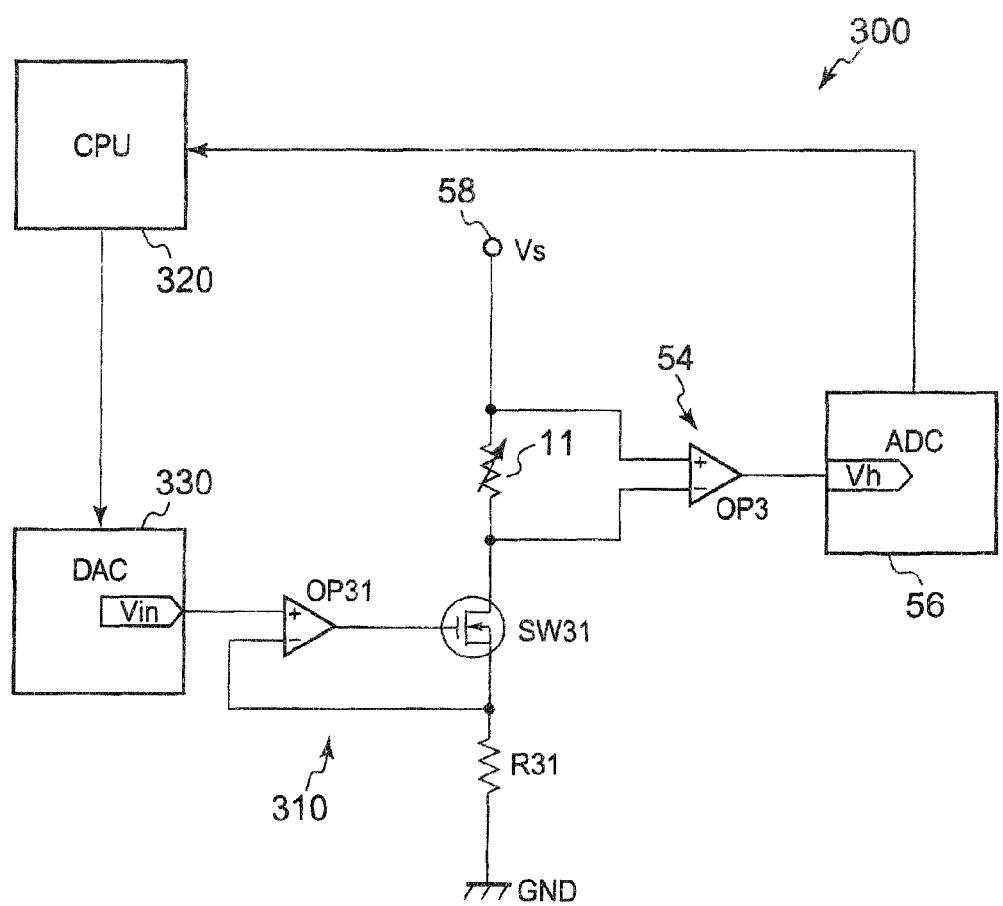
FIG. 8 is a circuit diagram showing the circuit configuration of a conventional temperature control apparatus as a comparative example.

FIG. 8 is a circuit diagram showing the circuit configuration of the conventional temperature control apparatus as the comparative example.

The temperature control apparatus 300 is composed of the resistance heater 11, the differential amplifier 54, the ADC 56, and a constant current circuit 310 composed of a switching element SW31 made of a transistor, an operational amplifier OP31, and a resister R31. The resistance heater 11, the differential amplifier 54, and the ADC 56 are the same as the ones in the configuration of the temperature control apparatus 5 of the aforesaid first embodiment shown in FIG. 2.

When a CPU 320 outputs a digital signal to a digital to analog converter (hereinafter, briefly referred to a DAC) 330, the digital signal is converted to an analog signal by the DAC 330, and a signal having the voltage level according to the digital signal is input into the noninverting input terminal of the operational amplifier OP31. A constant current of the magnitude according to the voltage level of the signal input into the noninverting input terminal of the operational amplifier OP31 then flows through the resistance heater 11. The CPU 320 thereby adjusts the magnitude of the current flowing through the resistance heater 11.

The voltage across the resistance heater 11 at the time when the constant current is flowing is then measured by the differential amplifier 54 and the ADC 56 to be fed back to the CPU 320.

The CPU 320 operates the measured voltage value across the resistance heater 11 to obtain the resistance value and the electric power of the resistance heater 11, and obtains the temperature of the resistance heater 11 on the basis of the temperature dependency of the resistance value of the resistance heater 11. The CPU 320 adjusts the magnitude of the current flowing through the resistance heater 11 on the basis of the obtained temperature of the resistance heater 11, and controls the temperature of the resistance heater 11 so as to be a set temperature.

Furthermore, an example of circuit design of the temperature control apparatus 300 shown in FIG. 8 is described by using concrete numerical value.

In FIG. 8, for example, an instrumentation amplifier (product name: AD628) available from Analog Devices, Inc., which has a sufficiently large input voltage range of 120 V, is used as the operational amplifier OP3.

A resistance having the resistance value of 250Ω at 280° C. is used as the resistance heater 11.

In the initial state, if it is supposed to flow a constant current of 120 mA through the resistance heater 11 on start-up, then the voltage across the resistance heater 11 is 30 V and the electric power is 3.6 W at the time when the temperature reaches 280° C. The maximum of the input voltage of the operational amplifier OP3 is the voltage at this time. If the ADC 56 and the CPU 320 of 8 bits process the output voltage of the operational amplifier OP3, resolution becomes 30/256=117 mV/digit. If the resolution is considered from the point of view of the temperature, then it becomes 280/256=1.09° C./digit. Thus, suitable accuracy to the catalyst reactions, which require the temperature management by the 1° C., is obtained.

From such a state, heat propagates to the whole processing apparatus main body 3. If the heat loss of the reformer 7 when the processing apparatus main body 3 becomes in a thermal equilibrium state is supposed to 1.5 W, the electric power of the resistance heater 11 equally becomes 1.5 W. At this time, the temperature of the reformer 7 is constant to be 280° C., and the resistance value of the resistance heater 11 is also constant to be 250Ω. Consequently, it is concluded that the temperature control is performed on the supposition that the voltage of the resistance heater 11 is 19.4 V and the current thereof is 77.5 mA.

From such a thermal equilibrium state, the supplies of a fuel and water are performed. When a reforming reaction is started in the reformer 7 and burning is produced in the combustor 9 (working state), if the supplied heat quantity by the resistance heater 11, which is necessary for keeping the reformer 7 at 280° C., is supposed to be 0.4 W, then the voltage of the resistance heater 11 at this time is 10 V and the current thereof is 40 mA. Incidentally, because the gain of the operational amplifier OP3 also in this state is the same as the one on start-up, the voltage of the resistance heater 11 is measured only as 10 V/117 mV=85 digit in the ADC 56. If it is considered from the point of view of a temperature, the resolution becomes 280° C./85 digit=3.29° C./digit, and it is found that the suitable accuracy is not obtained as the temperature to be used for feedback control.

On the other hand, an example of the circuit design of the temperature control apparatus 5 of the embodiment of the present invention shown in FIG. 2 is described by using concrete numeral values.

In the temperature control apparatus 5 of FIG. 2, for example, an instrumentation amplifier (product name: AD628) available from Analog Devices, Inc., which has a sufficiently large input voltage range of 120 V, is used as the operational amplifiers OP3 and OP4. A resistance heater having the resistance value of 250Ω at 280° C. is used as the resistance heater 11. Moreover, the sampling resistance R8 is 0.1Ω and any of the other resisters R1-R7 is 10 kΩ.

The frequency of the PWM signal is first set on the basis of the measurement speeds of the operation amplifiers OP3 and OP4 under the upper limit condition that is to be the frequency at which the weak current, which flows through the resistance heater 11 when the voltage level of the PWM signal is the off-voltage, can be stabled when the weak current falls to the desired level, and the lower limit condition that is to be the frequency faster than the follow-up speed of the temperature of the reformer 7, which is in the order of milliseconds.

If it is supposed that the measurements of the operational amplifiers OP3 and OP4 needs 20 μs, and if a surplus time of 10 μs for switching between the on-voltage and the off-voltage of the PWM signal and the stabilization of the weak current of the resistance heater 11 is supposed here, then the time during which the PWM signal is the off-voltage is led to be needed to be 30 μs or more.

However, the control at very low duty ratio is expected in the state in which the reforming reaction is caused in the reformer 7 described above (working state), and the frequency of the PWM signal is desired to be the one that is distant from the lower limit condition as much as possible to be a speed near to the upper limit condition in order to secure the temperature controllability. If the minimum requisite time (30 μs) is set to the time equivalent to 1% of the duty ratio with the aim of securing the resolution of control to a maximum extent, then the period of the PWM signal becomes slow to the millisecond order like 3 ms (330 Hz), and there is the possibility that the temperature is disturbed by following a control period.

On the other hand, if the minimum requisite time is made to be conversely set to be equivalent to a duty ratio higher than 10%, the maximum ratio of the on-voltage of the PWM signal becomes less than 90%. In order to secure the electric power necessary on start-up at this ratio, the constant voltage Vs must be set to be higher, and control accuracy and the circuit efficiency on the side of preparing a power source become worse.

In consideration of these factors, the minimum requisite time necessary for voltage measurement (30 μs) is set to be equivalent to 10% of the duty ratio here, and the PWM signal is set to be performed at the duty ratio within a range of 0-90%. At this time, the period of the PWM signal becomes 300 μs (3.3 kHz).

By the design described above, the duty ratio of the PWM signal is 90% in the initial state. At the time of the temperature of 280° C., the resistance value of the resistance heater 11 is 250Ω, the current corresponding to the resistance value is 126 mA, and the voltage across the resistance heater 11 is 31.5 V.

The voltage of the resistance heater 11 at this time is the controllable maximum voltage, and the voltage is set as the constant voltage Vs. The duty ratio at which the constant voltage Vs remains to be 31.5 V and the electric power of the resistance heater 11 is 1.5 W in a thermal equilibrium state is 38%, and the duty ratio at which the electric power of the resistance heater 11 is 0.4 W in a working state is 10%. It was confirmed that the margin of about 10% of the resolution for PWM control was able to be secured also in this working state.

Moreover, the maximum input voltage of the operational amplifier OP3 is suppressed to be 250Ω×3 mA=750 mV if the weak current at the time when the voltage level of the PWM signal is the off-voltage is supposed to be 3 mA. When the maximum input voltage is processed by the ADC 56 of 8 bits, the resolution considered in view of the temperature naturally becomes the same value 280° C./256=1.09° C./digit as the one obtained in the initial state of the comparative example because the temperatures and the numbers of the bits are each the same in both the cases. However, the method of the PWM control circuit designed here is superior in the point that it is possible to measure the temperature resolution in all the states of the system, and the voltage resolution becomes 750 mV/256=2.9 mV/digit.

The temperature control apparatus 5 can suppress the electric power consumption in comparison with the temperature control apparatus 300, and can raise the energy efficiency as the system. Consequently, because the measure for heat radiation of the temperature control apparatus 5 becomes unnecessary, the miniaturization of the circuit can be performed. Moreover, because the measurement of a voltage is performed only when the voltage level of the PWM signal is the off-voltage, the response voltage to the measurement is also small, and the response can be amplified by a high gain. As a result, the accuracy of the measured voltage and the temperature obtained from the measured voltage can be raised.

All of the disclosures including the patent specification, the claims, the attached drawings and the abstract of Japanese Patent Application No. 2007-074402 filed Mar. 22, 2007 are herein incorporated by reference.

Although various typical embodiments have been shown and described, the present invention is not limited to those embodiments. Consequently, the scope of the present invention can be limited only by the following claims.

What is claimed is:

1. A temperature control apparatus comprising:
a resistance heater whose resistance value changes depending on a temperature of the resistance heater;
a signal generator to output a control signal having two voltage levels including a first-voltage and a second-voltage which is different from the first-voltage;
an adder to constantly add a superimposing voltage to the control signal, the superimposing voltage being set to a constant voltage level;
a switching section which receives from the adder a signal obtained by adding the superimposing voltage to the control signal, to flow a first current that corresponds to a voltage obtained by adding the superimposing voltage to the first-voltage through the resistance heater when the voltage level of the control signal is the first-voltage, and to flow a second current, that corresponds to a voltage obtained by adding the superimposing voltage to the second-voltage and that has a current value smaller than a current value of the first current, through the resistance heater when the voltage level of the control signal is the second-voltage; and
a voltage measuring instrument to measure a voltage value across the resistance heater at a time when the second current flows through the resistance heater,
wherein the signal generator controls the temperature of the resistance heater by controlling the control signal based on the voltage value measured by the voltage measuring instrument.

2. The temperature control apparatus according to claim 1, wherein a voltage across the resistance heater is not applied to the voltage measuring instrument when the voltage level of the control signal is the first-voltage, and the voltage across the resistance heater is applied to the voltage measuring instrument when the voltage level of the control signal is the second-voltage, so that the voltage measuring instrument measures the voltage value across the resistance heater at the time when the second current flows through the resistance heater.

3. The temperature control apparatus according to claim 1, wherein:
the control signal is a pulse signal including the two voltage levels of the first-voltage and the second-voltage; and
the signal generator is a PWM controller equipped with a function of controlling a value of a duty ratio, which is a ratio between a time of the first-voltage of the control signal and a time of the second-voltage of the control signal.

4. The temperature control apparatus according to claim 3, wherein the signal generator derives the temperature of the resistance heater based on the voltage value measured by the voltage measuring instrument, and changes and re-sets the value of the duty ratio of the control signal so that the temperature of the resistance heater is brought close to a desired set temperature.

5. The temperature control apparatus according to claim 3, further comprising:
a current measuring instrument to measure a current value of a current flowing through the resistance heater; and
a resistance measuring instrument to measure the resistance value of the resistance heater based on the voltage value measured by the voltage measuring instrument and the current value measured by the current measuring instrument,
wherein based on the resistance value measured by the resistance measuring instrument and a resistance value of the resistance heater at a desired set temperature, the signal generator changes and re-sets the value of the duty ratio of the control signal so that the temperature of the resistance heater is brought close to the set temperature.

6. A processing apparatus to which a raw material is supplied and which is temperature-controlled to cause a reaction or a phase change of the raw material, the apparatus comprising:
a processing device to cause the reaction or the phase change of the raw material; and
a temperature control apparatus to control a temperature of the processing device, the temperature control apparatus including:
a resistance heater which is provided in the processing device to heat the processing device, wherein a resistance value of the resistance heater changes depending on a temperature of the resistance heater;
a signal generator to output a control signal having two voltage levels including a first-voltage and a second-voltage which is different from the first-voltage;
an adder to constantly add a superimposing voltage to the control signal, the superimposing voltage being set to a constant voltage level;
a switching section which receives from the adder a signal obtained by adding the superimposing voltage to the control signal, to flow a first current that corresponds to a voltage obtained by adding the superimposing voltage to the first-voltage through the resistance heater when the voltage level of the control signal is the first-voltage, and to flow a second current, that corresponds to a voltage obtained by adding the superimposing voltage to the second-voltage and that has a current value smaller than a current value of the first current, through the resistance heater when the voltage level of the control signal is the second-voltage; and
a voltage measuring instrument to measure a voltage value across the resistance heater at a time when the second current flows through the resistance heater, and
wherein the signal generator controls the temperature of the resistance heater by controlling the control signal based on the voltage value measured by the voltage measuring instrument.

7. The processing apparatus according to claim 6, wherein:
the raw material is a liquid;
the processing device is a vaporizer to heat the raw material to vaporize the raw material; and
the signal generator controls the temperature of the resistance heater so as to be brought close to a temperature suitable for the vaporization of the raw material.

8. The processing apparatus according to claim 6, wherein:
the raw material is a mixture gas produce by vaporizing water and a liquid fuel whose composition includes hydrogen;
the processing device is a reformer to produce a gas including the hydrogen by causing a reforming reaction of the raw material; and
the signal generator controls the temperature of the resistance heater so as to be brought close to a temperature suitable for causing the reforming reaction.

9. The processing apparatus according to claim 6, further comprising a combustor to which burning gas and oxygen is supplied, and which produces combustion heat caused by a catalyst reaction to heat the processing device.

10. The processing apparatus according to claim 6, wherein a voltage across the resistance heater is not applied to the voltage measuring instrument in the temperature control apparatus when the voltage level of the control signal is the first-voltage, and the voltage across the resistance heater is applied to the voltage measuring instrument when the voltage level of the control signal is the second-voltage, so that the voltage measuring instrument measures the voltage value across the resistance heater at the time when the second current flows through the resistance heater.

11. The processing apparatus according to claim 6, wherein:
the control signal in the temperature control apparatus is a pulse signal including the two voltage levels of the first-voltage and the second-voltage; and
the signal generator is a PWM controller equipped with a function of controlling a value of a duty ratio, which is a ratio between a time of the first-voltage of the control signal and a time of the second-voltage of the control signal.

12. The processing apparatus according to claim 11, wherein the signal generator in the temperature control apparatus derives the temperature of the resistance heater based on the voltage value measured by the voltage measuring instrument, and changes and re-sets the value of the duty ratio of the control signal so that the temperature of the resistance heater is brought close to a desired set temperature.

13. The processing apparatus according to claim 11, wherein the temperature control apparatus further comprises:
a current measuring instrument to measure a current value of a current flowing through the resistance heater; and
a resistance measuring instrument to measure the resistance value of the resistance heater based on the voltage value measured by the voltage measuring instrument and the current value measured by the current measuring instrument, and
wherein based on the resistance value measured by the resistance measuring instrument and a resistance value of the resistance heater at a desired set temperature, the signal generator changes and re-sets the value of the duty ratio of the control signal so that the temperature of the resistance heater is brought close to the set temperature.

14. A temperature control method for controlling a temperature of a resistance heater whose resistance value changes depending on the temperature, the method comprising:
outputting a control signal having two voltage levels including a first-voltage and a second-voltage which is different from the first-voltage;
constantly adding a superimposing voltage to the control signal, the superimposing voltage being set to a constant voltage level;
flowing a first current which corresponds to a voltage obtained by adding the superimposing voltage to the first-voltage through the resistance heater when the voltage level of the control signal is the first-voltage, and flowing a second current, which corresponds to a voltage obtained by adding the superimposing voltage to the second-voltage and which has a current value smaller than a current value of the first current, through the resistance heater when the voltage level of the control signal is the second-voltage;
measuring a voltage value across the resistance heater at a time when the second current flows through the resistance heater; and
controlling the control signal to control the temperature of the resistance heater based on the measured voltage value.

15. The temperature control method according to claim 14, wherein:
the control signal is a pulse signal including the two voltage levels of the first-voltage and the second-voltage; and
the control signal is controlled by controlling a value of a duty ratio, which is a ratio between a time of the first-voltage of the control signal and a time of the second-voltage of the control signal.

16. The temperature control method according to claim 15, wherein based on a desired set temperature and the temperature of the resistance heater obtained using the measured voltage value, the value of the duty ratio of the control signal is changed and re-set so that the temperature of the resistance heater is brought close to the set temperature.

17. The temperature control method according to claim 15, further comprising:
measuring a current value of a current flowing through the resistance heater; and
measuring the resistance value of the resistance heater based on the measured voltage value and the measured current value,
wherein based on the measured resistance value and a resistance value of the resistance heater at a desired set temperature, the value of the duty ratio of the control signal is changed and re-set so that the temperature of the resistance heater is brought close to the set temperature.

18. A temperature control method for controlling a temperature of a resistance heater whose resistance value changes depending on the temperature, the method comprising:
outputting a control signal having two voltage levels including a first-voltage and a second-voltage which is different from the first-voltage;
constantly adding a superimposing voltage to the control signal, the superimposing voltage being set to a constant voltage level;
flowing a first current which corresponds to a voltage obtained by adding the superimposing voltage to the first-voltage through the resistance heater when the voltage level of the control signal is the first-voltage, and flowing a second current, which corresponds to a voltage obtained by adding the superimposing voltage to the second-voltage and which has a current value smaller than a current value of the first current, through the resistance heater when the voltage level of the control signal is the second-voltage;
measuring a voltage value across the resistance heater at a time when the second current flows through the resistance heater, and measuring the resistance value of the resistance heater based on the measured voltage value and the current value of the second current; and
controlling the control signal to control the temperature of the resistance heater based on the measured resistance value.

19. The temperature control method according to claim 18, wherein:
the control signal is a pulse signal including the two voltage levels of the first-voltage and the second-voltage; and
the control signal is controlled by controlling a value of a duty ratio, which is a ratio between a time of the first-voltage and a time of the second-voltage.

20. The temperature control method according to claim 19, wherein based on the measured resistance value and a resistance value of the resistance heater at a desired set temperature, the duty ratio of the control signal is changed so that the temperature of the resistance heater is brought close to the set temperature.

* * * * *